(12) United States Patent
Khanna

(10) Patent No.: US 6,895,442 B1
(45) Date of Patent: May 17, 2005

(54) TECHNIQUE FOR FAST AND EFFICIENT INTERNET PROTOCOL (IP) ADDRESS LOOKUP

(75) Inventor: Sanjay Khanna, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 853 days.

(21) Appl. No.: 09/680,791

(22) Filed: Oct. 6, 2000

(51) Int. Cl.[7] ........................ G06F 15/16; G06F 15/173
(52) U.S. Cl. ........................ 709/245; 709/242; 709/238
(58) Field of Search .............................. 709/212, 223, 709/227, 230, 238, 245, 229, 220, 235

(56) References Cited

U.S. PATENT DOCUMENTS

| | | | | |
|---|---|---|---|---|
| 6,381,638 | B1 * | 4/2002 | Mahler et al. | 709/220 |
| 6,466,779 | B1 * | 10/2002 | Moles et al. | 455/410 |
| 6,603,769 | B1 * | 8/2003 | Thubert et al. | 370/401 |
| 6,647,427 | B1 * | 11/2003 | Watanabe | 709/239 |
| 6,658,481 | B1 * | 12/2003 | Basso et al. | 709/243 |
| 6,711,623 | B1 * | 3/2004 | Furukawa et al. | 709/249 |

OTHER PUBLICATIONS

"Routing Lookups in Hardware at Memory Access Speeds", P. Gupta; S. Lin and N. McKeown, Computer Systems Laboratory, Stanford University.

* cited by examiner

Primary Examiner—Ario Etienne
Assistant Examiner—Hussein Chanti
(74) Attorney, Agent, or Firm—Jerry W. Herndon; Marcia L. Doubet

(57) ABSTRACT

The present invention provides a method, system, and computer program product for fast and efficient IP (Internet Protocol) address lookup. IP address values are interpreted using a separate array for each 8-bit component of the address. This technique is therefore exploitable in a multi-processing environment. The IP address look-up time when using the present invention is nearly constant, regardless of the particular address value. Minimal, if any, locking is required. This technique can be used equally well with class-specific IP version 4 32-bit addresses and with Classless Inter-Domain Routing (CIDR), and easily extends to use with IP version 6 128-bit addresses.

27 Claims, 6 Drawing Sheets result=F(a.b.c.d),
F=lookup function

Route R1: 9.67.96.0   255.255.255.0 G1
Route R2: 9.67.96.5   255.255.255.255 G2
Route R3: 9.67.111.0  255.255.240.0 G3

TECHNIQUE FOR FAST AND EFFICIENT INTERNET PROTOCOL (IP) ADDRESS LOOKUP

BACKGROUND OF THE INVENTION

1. Field of the Invention

The present invention relates to distributed computing, and deals more particularly with a method, system, and computer program product for quickly and efficiently looking up IP (Internet Protocol) addresses, for example in routing tables used by network routers.

2. Description of the Related Art

Business and consumer use of distributed computing, also commonly referred to as network computing, has gained tremendous popularity in recent years. In this computing model, the data and/or programs to be used to perform a particular computing task typically reside on (i.e. are "distributed" among) more than one computer, where these multiple computers are connected by a network of some type. The Internet, and the part of the Internet known as the World Wide Web (hereinafter, "Web"), are well-known examples of this type of environment wherein the multiple computers are connected using a public network. Other types of network environments in which distributed computing may be used include intranets, which are typically private networks accessible to a restricted set of users (such as employees of a corporation), and extranets (e.g., a corporate network which is accessible to other users than just the employees of the company which owns and/or manages the network, such as the company's business partners).

The Internet Protocol (IP) is used to enable the interconnected networks of the Internet to communicate with each other. In the most commonly used version of IP, which is known as "IPv4", the network address of each sender and receiver of information is specified as a 4-byte (32-bit) number. The leftmost bits of an IP address uniquely identify the network in which a particular device is located, and the rightmost bits uniquely identify the device within that network. The bits comprising the network identification are commonly referred to as the network number or network prefix of an IP address, while the rightmost are commonly referred to as the local address or host address.

Originally, IP addresses were divided into 4 classes, referred to as Class A, Class B, Class C, and Class D. In this addressing scheme, the bit settings in the leftmost 4 bits of the 32-bit address identify the class for a particular IP address. Each different class uses a different boundary for distinguishing which part of a 32-bit address is considered to be the network prefix, and which part is considered to be the local address. A network address from a Class A network uses 7 bits for the network prefix and 24 bits for the local address. A Class B network uses 14 bits for the network prefix and 16 bits for the local address. A Class C network uses 21 bits for the network prefix and 8 bits for the local address, and a Class D network uses 28 bits as a multicast address. The 32-bit addresses are commonly expressed using what is known as "dotted quad" notation, where each 8-bit byte of an address is converted to a decimal representation and the 4 decimal numbers are then written as a string separated by periods. Thus, the dotted quad representation of a Class A network address specifies the network number as the first decimal number, followed by 3 decimal numbers identifying the local address; the dotted quad representation of a Class B network address, on the other hand, can be interpreted as "network.network.local.local.".

A 3-level addressing scheme may alternatively be represented within the 32 bits, where the additional level is used to group local addresses into subnetwork, or subnet, addresses. The combination of the network prefix with the subnet address is referred to as an "extended network prefix". A subnet mask, which is a 32-bit number specified as a series of contiguous 1-bits on the left and 0-bits on the right, is used to indicate where the extended network prefix ends and the local address begins.

The gateways and routers which are responsible for routing data packets through a distributed network must store information about the path to use in order to route the packets destined for a particular address. This information is stored in routing tables (sometimes referred to as a "routing cache"). Use of subnet addressing enables reducing the number of entries in a routing table, because routers and gateways which are external to an organization's private network need only contain a routing table entry for the organization's network address: the organization's internal routers then handle the routing among subnetworks using the subnet address specified in a data packet.

Several problems were encountered with the 4-class addressing scheme as distributed computing gained in popularity. It appeared as though the range of available address numbers would soon be exhausted, and many of the addresses which had already been assigned were not being used, due to the inflexible boundaries dictated by this addressing scheme.

A technique known as Classless Inter-Domain Routing (CIDR) was developed to address these problems. In CIDR, a network mask value is used to determine the boundary between network addresses (including the subnet address) and the local address, without regard to any notion of class structures. CIDR requires that routers and gateways use a consistent, longest-match algorithm for forwarding data packets. In this algorithm, that part of the destination address in a data packet which is identified as being the network address (using the network mask) is compared to entries in a routing table (where the table entries are generally also specified in terms of a network mask) to located the path to be used for forwarding the packet. If more than one routing table entry matches the destination address, then the more specific entry (which is the entry having the longest network prefix) must be used.

Even though CIDR provides interim relief for address assignment, 32 bits is deemed to be insufficient for supporting the future growth of distributed computing. Thus, a newer addressing scheme known as "IPv6" has been defined which uses 128-bit addresses. This addressing scheme has not yet been widely implemented.

Routers and gateways (referred to hereinafter as routers, for ease of reference) must be able to quickly evaluate the IP address in a data packet in order to determine how to route the packet while providing an acceptable level of performance and throughput. As link speeds are increasing, the number of IP packets which a router is required to process per second is becoming very high. One critical factor in the router's performance and throughput is the route lookup technique used with the routing tables.

Most implementations of routing tables today use radix trees. Radix trees require a significant amount of programming logic, and expenditure of a significant amount of computing time in traversing the trees to find a particular route. Furthermore, radix trees cannot exploit a multiprocessor (MP) approach wherein the computing task is shared among processors. Another existing technique is use of stored linked lists. Linked lists have well-known performance problems, and are also not MP-exploitable. Some existing implementations use hash tables along with sorted linked lists. This approach provides performance which is significantly better than linked lists alone, but still does not provide an optimal (nor an MP-exploitable) solution. A technique designated "DIR-24-8-BASIC" was proposed by Pankaj Gupta et al. at Infocomm 1998, where two separate routing tables are used: one table for routes which are less than 25 bits long, and a different table for routes which are 25 bits or longer. This technique, however, assumes that most routes have prefixes of 24 bits or less and is therefore thought by the inventor of the present invention to have a rather narrow focus. (A copy of this conference paper was published on the Internet at a web page of Stanford University.) A technique known as "Multi-Protocol Label Switching" (MPLS) has also been proposed, where this technique would replace the longest-prefix match approach with a simple direct lookup. This approach, however, would require adoption of new protocol standards, and thus is not earily nor quickly adaptable into the established distributing computing infrastructure.

In addition to the need to inspect IP addresses for routing purposes, there are a number of new servers or gateways which provide a specific service based upon the IP address of the client. Examples include firewalls, IPSec (IP Security) gateways, and Dynamic Host Configuration Protocol (DHCP) servers. (For example, DHCP server, which manage the assignment of IP addresses to hosts, generally function differently depending on whether the host client or a server.) The performance of these servers and gateways will be constrained by the time it takes to inspect the IP address and determine which service to provide Accordingly, what is needed is an improved technique for evaluating or interpreting IP address values.

SUMMARY OF THE INVENTION

An object of the present invention is to provide an improved technique for evaluating or interpreting IP address values.

Another object of the present invention is to provide an IP address lookup technique which is MP exploitable.

It is another object of the present invention to provide a technique which enables IP address lookup time to be nearly constant, regardless of the particular address value.

Yet another object of the present invention to provide a technique which enables IP address lookup to occur with minimal locking requirements.

A further object of the present invention to provide a technique for IP address lookup which can be used with CIDR.

Still another object of the present invention to provide an IP address lookup technique which easily extends to use with IPv6 addresses.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a computer program product, a system, and a method for fast and efficient address lookup for an address comprised of a plurality of address components and wherein each address component is deemed to be more significant than its next-sequential neighboring address component. In a preferred embodiment, this technique comprises: creating a plurality of arrays comprising an array for each of the address components, wherein each array comprises a plurality of entries which are indexed using values of the address component for which the array was created; and retrieving the stored information associated with a selected address value from the plurality of arrays. Creating the plurality of arrays preferably further comprises: obtaining a particular address value to be represented in the plurality of arrays; obtaining a bit mask associated with the particular address value; indexing into a highest-order one of the arrays using a most-significant component of the particular address value as an index element; setting a flag associated with the index element to on if the bit mask indicates that the next-sequential neighboring address component is considered significant, and setting the flag to off otherwise; and repeating the indexing and setting while the bit mask indicates that the next-sequential neighboring address component is considered significant, and (1) storing information associated with the particular address value in a storage or memory location and (2) setting a pointer field associated with index element to point to the storage or memory location, otherwise. Retrieving the stored information preferably further comprises: obtaining the selected address value; obtaining a selected bit mask associated with the selected address value; indexing into the highest-order one of the arrays using the most-significant component of the selected address value as the index element; and determining that no result is available if the index element has no stored information, and continuing otherwise. The continuing further comprises: checking the flag associated with the index element; and returning the stored information from the storage or memory location pointed to by the pointer filed when the flag is set off or repeating the indexing and determining when the flag is set on.

The repeating preferably further comprises setting a use count associated with the storage or memory location to a number which represents a count of the array entries which point to this storage or memory location when the next-sequential neighboring address component is not considered significant.

The stored information in the memory or storage location may comprise an associated bit mask, and the retrieving may further comprises resolving a collision. Resolving the collision further comprises: comparing the selected address value to each bit mask associated with the stored information from multiple storage or memory locations, yielding a plurality of bit mask results; and selecting a collision result using that one of the bit mask results which both (1) matches the selected address value according to the selected bit mask and (2) has the longest associated bit mask.

The address may be an Internet Protocol (IP) address. In this case, it may be an IP version 4 address, and thus there are 4 components in each IP version 4 address and 4 arrays in the plurality. Or, the IP address may be an IP version 6 address, and thus there are 16 address components in each IP version 6 address and 16 arrays in the plurality.

The present invention will now be described with reference to the following drawings, in which like reference number denote the same element throughout.

DESCRIPTION OF THE PREFERRED EMBODIMENT

Figure 1:
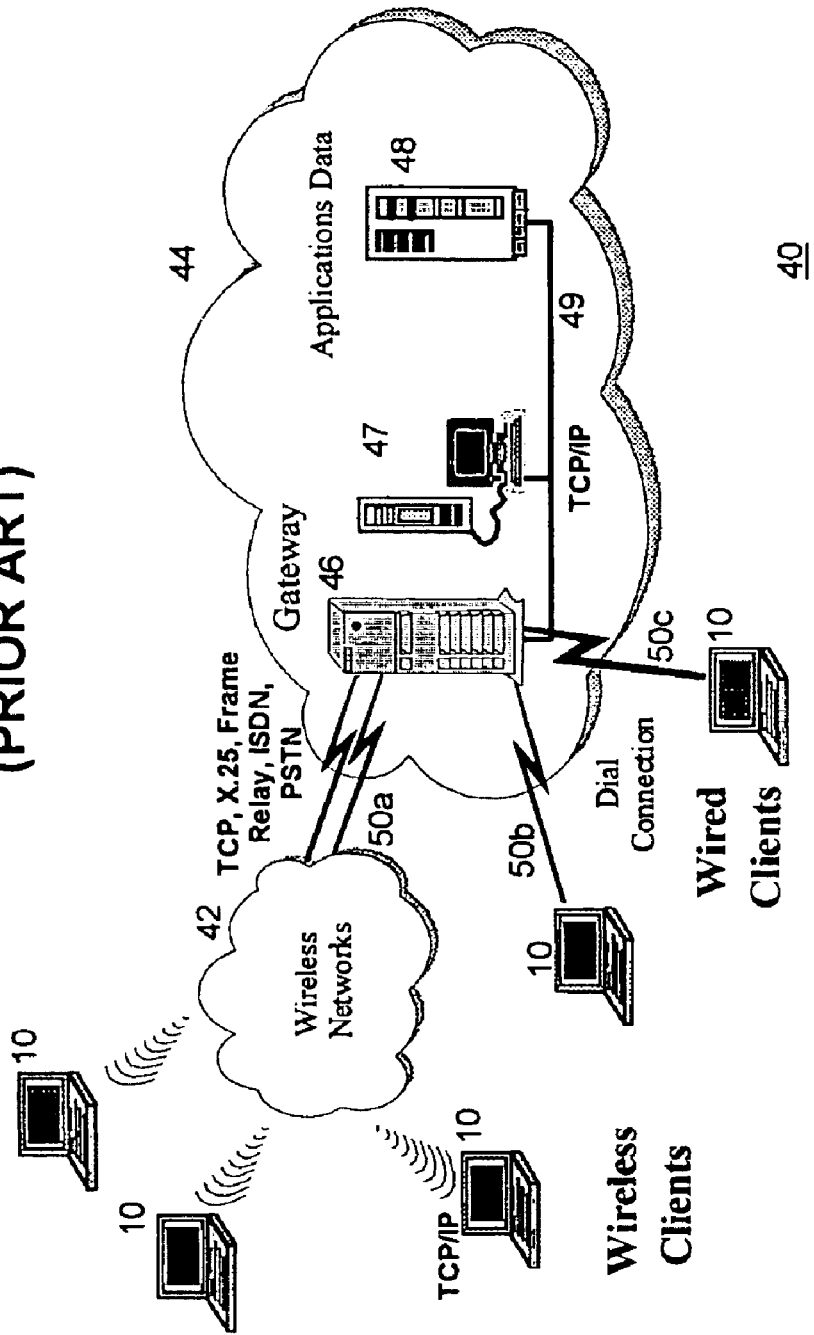
FIG. 1 is a diagram of a networked computing environment in which the present invention may be practiced.

FIG. 1 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 1, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from the International Business Machines Corporation (IBM), an Enterprise Systems Architecture/390 computer, etc. Depending on the application, a midrange computer, such as an Application System400 (also known as an AS/400) may be employed. ("Enterprise Systems Architecture/370" is a trademark of IBM; "Enterprise Systems Architecture/390", "Application System/400", and "AS/400" are registered trademarks of IBM). These are merely representative types of computers with which the present invention may be used. One or more routers (not shown) are typically used to route traffic among networks.

The gateway computer 46 may also be coupled 49 to a storage device (such as data repository 48). Further, the gateway 46 may be directly or indirectly coupled to one or more workstations 10, and servers such as gateway 46 and application server 47 may be coupled to other servers such as server 43.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay ISDN (Intergrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 1.

In the preferred embodiment, the present invention is implemented in computer software, although a solution implemented partly or entirely in hardware is also within the scope of the present invention. When implemented in software, the programming code which embodies the present invention is typically accessed by a router (or, equivalently, by a server or gateway such as server 43, gateway 46, and/or server 47) from long-term storage media of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory of the appropriate device. The techniques and methods for embodying software programming code in memory, on physical media, and/or distributing software code via networks are well known and will not be further discussed herein.

The present invention provides a flexible, efficient, and fast technique for looking up IP addresses. This lookup function will be discussed herein in terms of looking up IP addresses in routing tables, although this is for purposes of illustration and not of limitation. Alternatively, IP addresses may be used for looking up other types of information, such as information which determines a particular service to be performed based upon the value of a particular address (as in the DHCP example previously described). Also, it should be noted that this technique is adaptable to addresses other than IP addresses, provided those other addresses have similar characteristics (such as use of multiple address components, etc.).

In the preferred embodiments, a separate array is used for each 8-bit component of an IP address. When used with IPv4 addresses, 4 such arrays are needed; an implementation used with IPv6 requires 16 arrays. Preferably, each array has $2^8=256$ distinct entries, such that each 8-bit address component is used to index to one of these entries. The preferred embodiment will be described using the dotted quad notation, which in an IPv4 example may be depicted in the form "a.b.c.d". The preferred embodiment also assumes that IP addresses have an associated mask, as previously discussed. The least specific mask value is 0.0.0.0, and the most specific mask value is 255.255.255.255.

Figure 2:
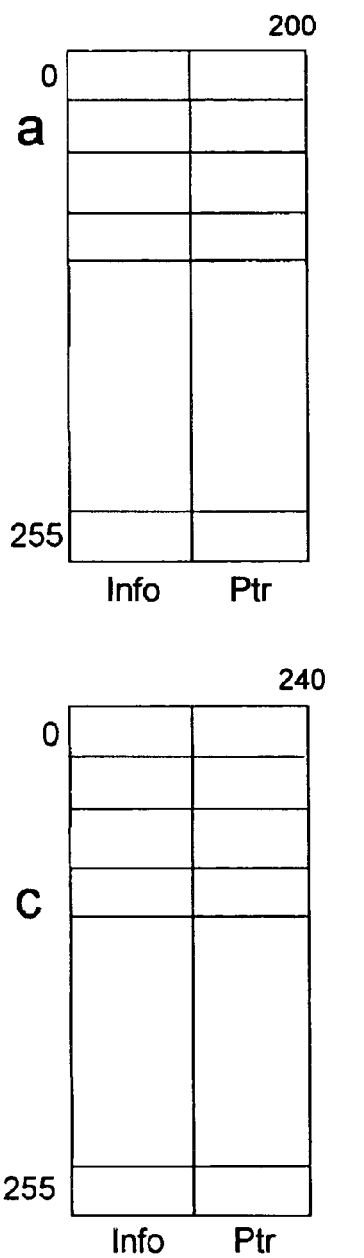
FIG. 2 provides an overview of the technique used by the preferred embodiment of the present invention when storing and subsequently interpreting 32-bit IP addresses.
Figure 2:
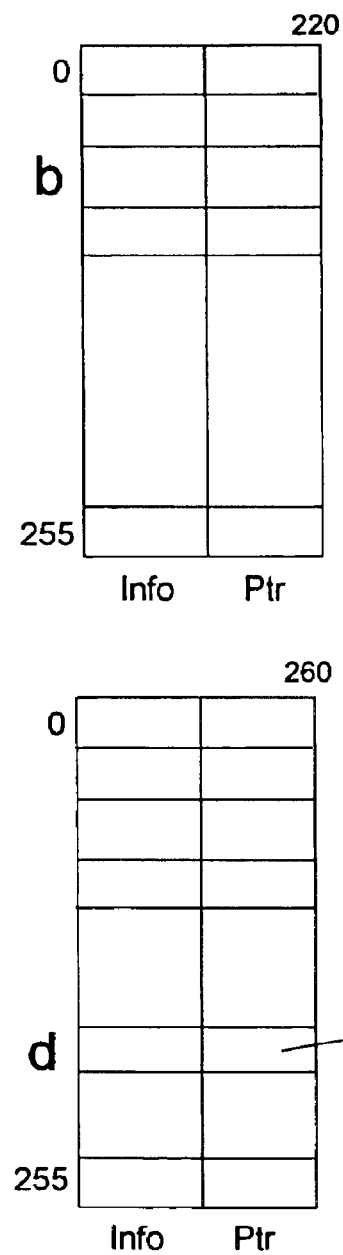

As shown in FIG. 2, 4 separate arrays 200, 220, 240, 260 are used in the preferred embodiment when interpreting 32-bit IP addresses. For a particular address a.b.c.d, the first 8-bit component ("a" in this example) is used to index into the first array 200. The remaining components are used to index into the other arrays 220, 240, 260, as shown in FIG. 2. When performing an example lookup function "F" on an address a.b.c.d, the illustration in FIG. 2 shows information 270 (such as a control block for a route "RTE") being located as a result. This technique is MP-exploitable because the array lookups may be performed by separate processors, if desired. (For example, a separate processor could be used for each array, or one processor could be used for looking up the first and then the second components while another processor simultaneously looks up the third and then the fourth components.)

In the preferred embodiment, each of the 256 entries in each array is 8 bytes long, where the first 4 bytes may be used for status or informational purposes and the remaining 4 bytes may be used as a pointer field which points to a control block. Alternatively, the pointer field may point to the head of a chain of control blocks, where the control blocks in the chain are then processed (for example) sequentially. Or, the pointer filed may point to an intermittent structure such as a hash table. The hash table approach will be useful in scenarios where there is a significant possibility of running into long chains of control blocks, and thus the hash table is used to enable accessing the multiple control blocks pointed to by a single pointer field more efficiently. Techniques for using hash tables to improve access efficiency are well known, and will not be described in detail herein.

Note that the preferred embodiments uses 8-byte entries, which are convenient when using CDS (Compare Double and Swap) operations in an MVS (Multiple Virtual Storage) system. Alternatively, array entries of other lengths can be used without deviating from the scope of the present invention, and those entries may be divided in ways other than using 2 equal-sized divisions. Furthermore, the array entries may contain information which is interpreted differently than that used to illustrate the operation of the preferred embodiment. These alternatives are within the scope of the present invention.

Regardless of the number of arrays in use (i.e. preferably 4 for IPv4 and 16 for IPv6), the length of entries in the arrays, and the interpretation of the contents of those entries, the most specific lookup answer found when using the present invention will be in the last byte array used, and the least specific entry will be in the first byte array.

When using 4 arrays which are indexed by 8-bit numbers and therefore have 256 entries, each of which are 8 bytes long, each array requires 2,048 bytes and the total memory or storage required is therefore a total of 8,192 bytes. The cost of performing a lookup operation is, in the general case, 4 lookup operations plus the cost of walking the chain or performing the hash search, as appropriate. Thus, the cost of looking up a particular IP address is nearly constant, regardless of the address value. For maintaining routing table entries, MVS routing table techniques of the prior art require 2 locks to be held when adding or deleting entries in routing tables. With the present invention, however, the additions and deletions can be done using CDS and the implementation can be very much lock-less (that is, the CDS instruction allows updating fields without holding any locks since it serializes itself against any other threads).

The preferred embodiment of the present invention will now be discussed in more detail with reference to the examples illustrated in FIGS. 3 and 4.

Figure 3:
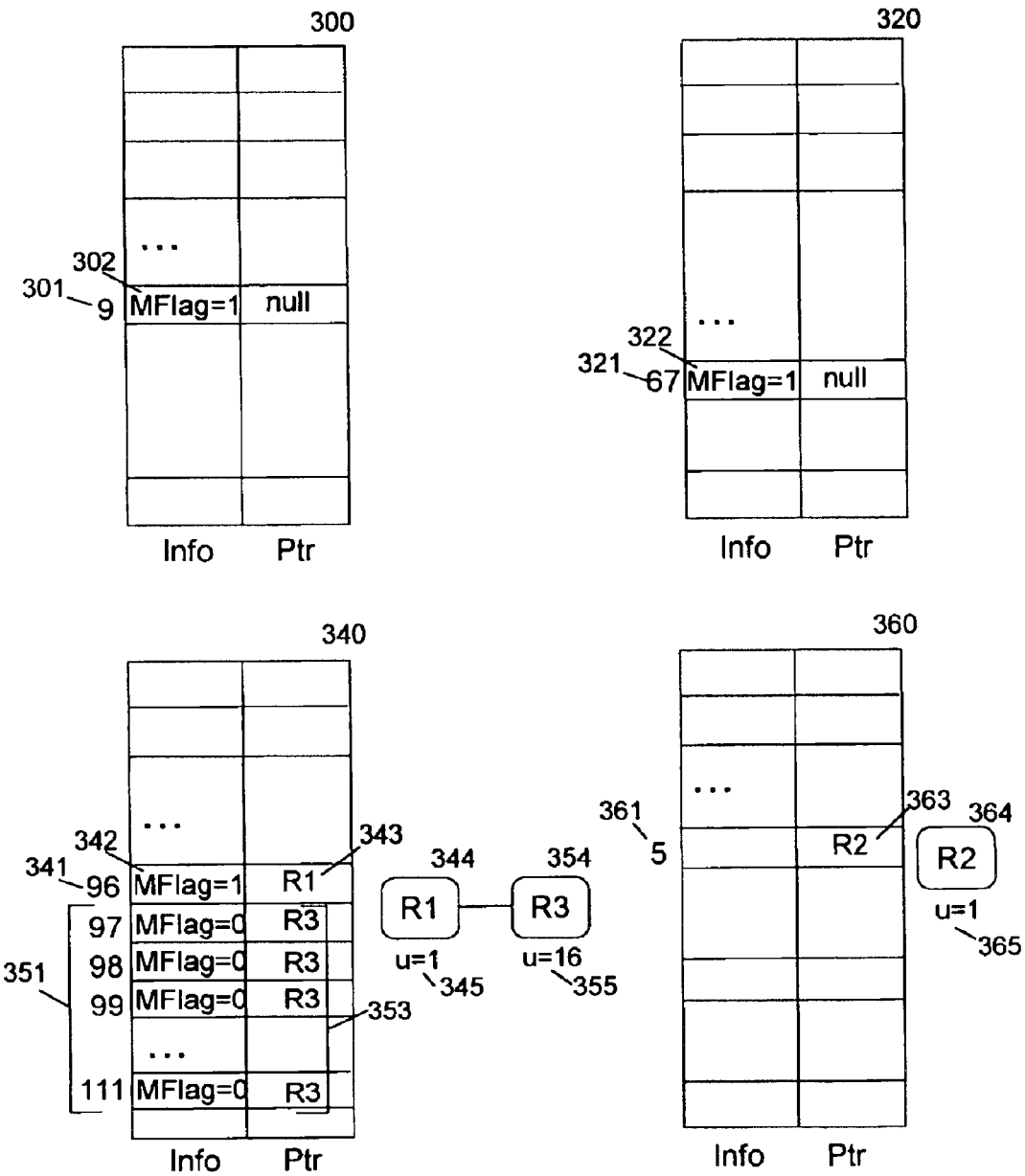
FIG. 3 illustrates an example of adding routes to routing tables, according to the preferred embodiment of the present invention.

FIG. 3 illustrates an example of adding routes to routing tables, according to the preferred embodiment of the present invention. In this preferred embodiment, the information portion of each array entry includes a bit or flag which is shown in the figures as "MFlag" and referred to herein as the "more flag". When set off, the more flag indicates that there is no more information stored in the subsequent lower-level arrays (i.e. the arrays for the next 8-bit components of the address); when set on, the more flag indicates that the next lower-level array contains more information.

Suppose a routing table entry is to be added for the route 9.67.96.0, using the network mask 255.255.255.0. This route is referred to as "R1" in FIGS. 3 and 4, and its mask is referred to as "G1". The value of mask G1 indicates that the first 3 of 4 address components are significant when determining routing using rouet R1. Because there is more information than just the first address component (having the value 9) in this routing table entry, the more flag 302 associated with index entry 9 (shown as element 301) in the first array 300 is set on. Similarly, the more flag 322 associated with index entry 67 (element 321) in the second array 320 is set on. Because there is no further significant information, according to mask G1, after the third address component, the more flag for the value 96 (shown at 342 for index entry 341) is initially set to off. (Note that the value of more flag 342 is shown in FIG. 3 as being set on: this value is changed from its initial setting when processing the next example described below.) The routing table information associated with this route is stored in a control block 344, which is pointed to by the pointer field 343. In the preferred embodiment, a "use count" is associated with each control block, indicating how many different routes use the information in the control block. Because the G1 mask is a specific value for all 24 bits which comprise the first 3 address components, only 1 route uses this R1 information and thus the use count 345 is set to 1. With this R1 entry in the routing table, a route lookup for IP address 9.67.96.x (where "x" represents an arbitrary value) using a mask length of 24 bits would then access element 301 in array 300; it would see from more flag 302 that there was more information to be learned by accessing element 321 in array 320; it would see from more flag 322 that array 340 should be checked; it would access array 340 at element 341; and it would then determine from more flag 342 (which would be set to off at this point) that there was no more information to be learned from accessing the last array 360. Thus, the routing information in control block 344 would then be retrieved by following pointer 343.

Suppose that another routing table entry is to be added for the route 9.67.96.5, using the network mask 255.255.255.255. This route is referred to as "R2" in FIGS. 3 and 4, and its mask is referred to as "G2". The value of mask G2 indicates that all 4 address components are significant when using the routing table entry for route R2. The more flags corresponding to the first 2 address components (flags 302 and 322 in FIG. 3) have already been set to 1, so no change is required to those array entry values. However, the mask value of G2 used with route R2 considers all 32 bits of the address value as being significant, and thus it is necessary to look into the fourth array 360 as well as the third array 340. Thus, the more flag 342 is now set to on. (As will be obvious, there is no more flag associated with entries in the final array). The index entry 361 associated with the final address component (having the value 5) then has its pointer field 363 set to point to a control block 364 in which the routing table information associated with this route is stored. Because the G2 mask is a specific value for all 32 bits which comprise the 4 address components, only 1 route uses this R2 information and thus the use count 365 is set to 1.

Finally, a third routing table entry is to be added for the route 9.67.111.0, using the network mask 255.255.240.0. This route is referred to as "R3" in FIGS. 3 and 4, and its mask is referred to as "G3". The value of mask G3 indicates that the first 20 bits of the IP address are significant where using the routing table entry for route R3. As discussed above with reference to addition to route R2, no change is needed to the more flags corresponding to the first 2 address components. Route R3 with its mask G3 corresponds to routes 9.67.96.x through 9.67.111.x, as will be obvious to one of skill in the art by evaluating the corresponding bit settings. Thus, entries are created in the third array 340 for each route which is not yet represented therein. In particular, entries are created for index entries 97 though 111, as shown at element 351. Because the G3 mask value used with route R3 considers the final 12 bits of the address value as being insignificant, it is not necessary to look into the fourth array 360 and therefore the more flags for these entries are set to off. The pointer filed 353 for these entries are set to point to a control block 354 in which the routing table information associated with this route is stored. Note that R3 is now also an allowable alternative route to R1 (for address 9.67.96.x). Thus, a chain of control blocks is preferably created, wherein the control block 344 for R1 appears in the chain prior to the control block 354 for R3 (because R1 is more specific than R3). The use count 355 for R3's control block 354 is set to 16 because there are 16 entries (including the entry 96 and all the entries up through and including entry 111) which point to this control block.

Figure 4A:
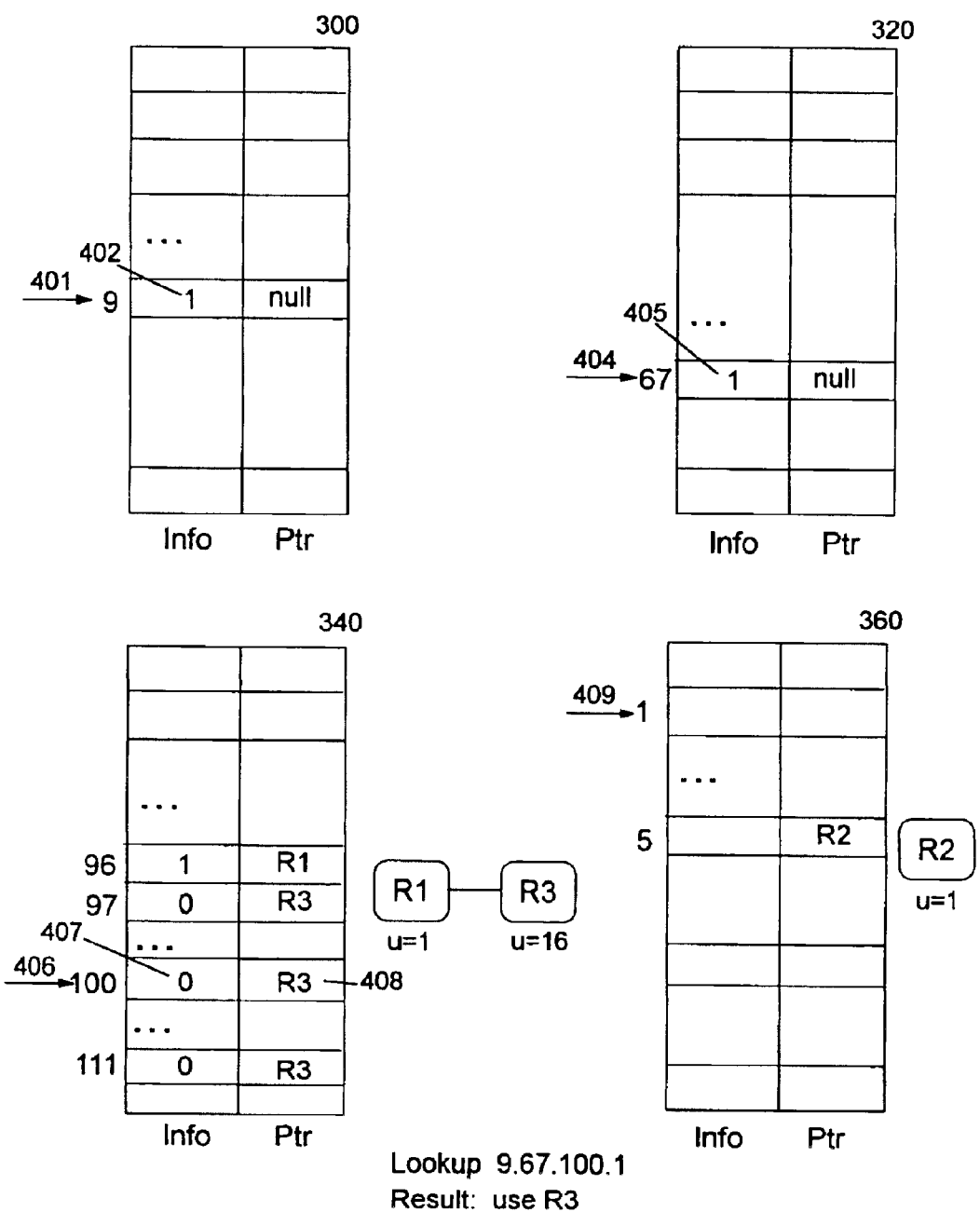
FIGS. 4A–4C illustrate examples of looking up routes in the routing tables created by the example of FIG. 3, according to the preferred embodiment of the present invention.
Figure 4B:
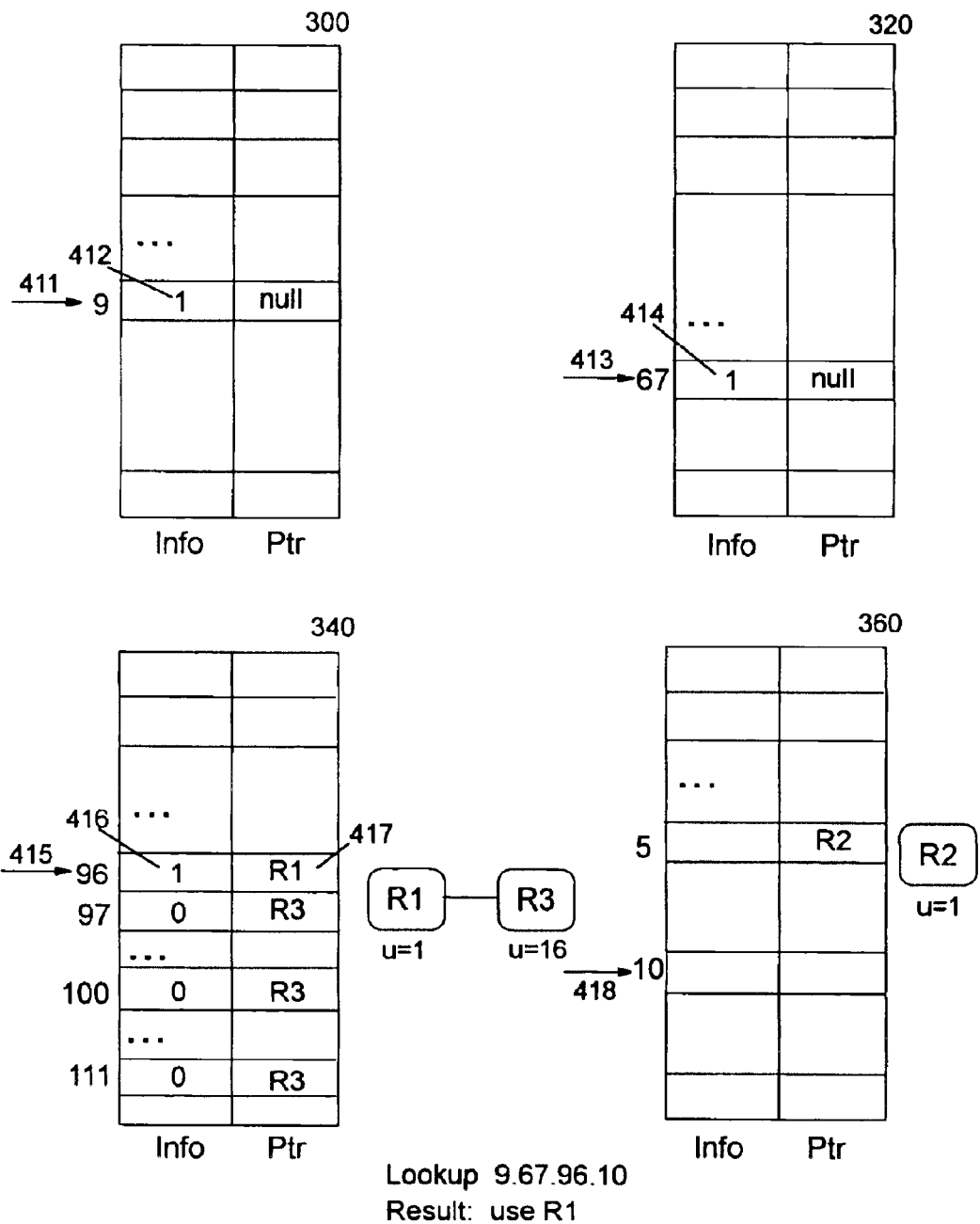
Figure 4C:
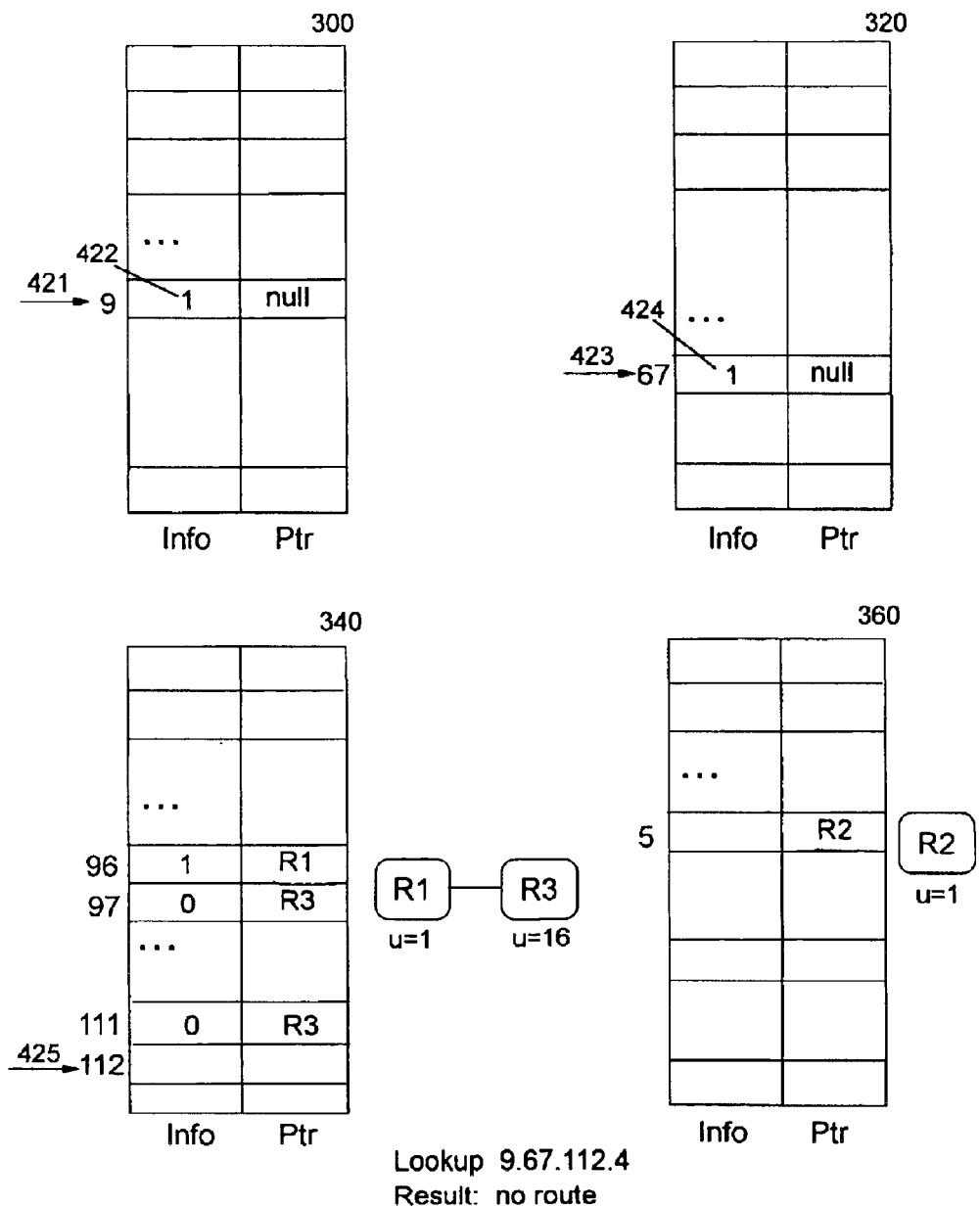

FIGS. 4A–4C illustrate examples of looking up routes in the routing tables which have been created by the above-described examples referencing FIG. 3, according to the preferred embodiment of the present invention.

Suppose a route 9.67.100.1 is to be looked up. This example is illustrated in FIG. 4A. Using the value 9 as an index entry (shown at 401) into the first array, a more flag 402 which is set on is found, indicating that the next lower level array should be searched. The value 67 is therefore used as an index (shown at 404) into the second array, where again a more flag 405 which is set on is found. The value 100 is therefore used to index (shown at 406) into the third array. The pointer field 408 for this array element points to R3. Because the more flag 407 is set off, it is not necessary to use the value 1 as an index (shown at 409) into the final array. Thus, R3 is the final answer.

As another example, suppose a route 9.67.96.10 is to be looked up. This example is illustrated in FIG. 4B. The more flags associated with index entries 9 and 67 in the first and second arrays, respectively, indicate that more information is to be found in the third array (as shown in FIG. 4B at 411, 412, 413, 414). Indexing into this third array with the value 96 (shown at 415), a more flag 416 set to on is found, along with a pointer field 417 which points to the control block for R1. Because the more flag 416 is set, the value 10 is then used as an index (shown at 418) into the final array. No value is found there, so the control block chain located with the pointer field 417 in the third array is traversed. Using the G1 mask which is associated with the R1 route of the first control block entry on the chain, the mask value is ANDed with the route being looked up, yielding a result of 9.67.96.0. Because this route matches the route destination (i.e. the result of the AND operation is the same as the result of performing an AND with the G1 mask and the R1 route), this route will be selected. If this route did not match, then the next entry in the chain would be analyzed similarly, until reaching either a match or the end of the chain, whichever occurs first. (Note that placing the control blocks on the chain in decreasing order of the number of significant bits, as shown in the examples for the preferred embodiment, eliminates the need to search each entry in the chain to find out which one yields the longest match.)

As yet another example, suppose route 9.67.112.4 is to be looked up. This example is illustrated in FIG. 4C. Again, the more flags associated with index entries 9 and 67 in the first and second arrays indicate that more information is to be found in the third array (shown as elements 421, 422, 423, 424 of FIG. 4C). Indexing into this third array with the value 112 (shown at 425), no entry is found. Thus, the search is backed up to the second array. Because the pointer for entry 67 is null, no match exists here and the search is then backed up to the first array. There is also no match here because the pointer for entry 9 is null. The result of this search is therefore that there is no explicit route to this destination. (Preferably, a check is then made to determine if there is a default route than can be used for this situation, such as 0.0.0.0.)

As has been demonstrated, the present invention provides a novel technique for lookup of IP addresses which is fast and efficient, and which requires a minimal amount of storage. Using this technique, lookup time is nearly constant, regardless of the value being looked up. This technique may be exploited using multiple processors to further increase lookup speed. The disclosed technique may be used equally well with class-specific IP version 4 32-bit addresses and with Classless Inter-Domain Routing (CIDR), and easily extends to use with IP version 6 128-bit addresses. The technique capitalizes on the fact that the most specific searches are at an array associated with the final address component, and the least specific are at an array associated with the first address component. Furthermore, it exploits how IP addresses are subneted, and how routes are added for various subnets/hosts for a particular organization.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. A computer program product for providing fast and efficient address lookup for an address comprised of a plurality of address components and wherein each address component is deemed to be more significant than its next-sequential neighboring address component, the computer program product embodied on one or more computer-readable media and comprising:

computer-readable program code means for creating a plurality of arrays comprising an array for each of the address components, wherein each array comprises a plurality of entries which are indexed using values of the address component for which the array was created, further comprising:

computer-readable program code means for obtaining a particular address value to be represented in the plurality of arrays;

computer-readable program code means for obtaining a bit mask associated with the particular address value;

computer-readable program code means for indexing into a highest-order one of the arrays using a most-significant component of the particular address value as an index element;

computer-readable program code means for setting a flag associated with the index element to on if the bit mask indicates that the next-sequential neighboring address component is considered significant, and for setting the flag to off otherwise; and computer-readable program code means for repeating the indexing and setting, using the next-highest-order one of the arrays and the next-most-significant component of the particular address value, while the bit mask indicates that the next-sequential neighboring address component is considered significant, and for (1) storing information associated with the particular address value in a storage or memory location and (2) setting a pointer field associated with the index element to point to the storage or memory location, otherwise; and computer-readable program code means for retrieving the stored information associated with a selected address value from the plurality of arrays, further comprising:
    computer-readable program code means for obtaining the selected address value;
    computer-readable program code means for obtaining a selected bit mask associated with the selected address value;
    computer-readable program code means for indexing into the highest-order one of the arrays using the most-significant component of the selected address value as the index element; and
    computer-readable program code means for determining that no result is available if the index element has no stored information, and for continuing otherwise, wherein the continuing further comprises:
        computer-readable program code means for checking the flag associated with the index element; and
        computer-readable program code means for returning the stored information from the storage or memory location pointed to by the pointer field when the flag is set off or for repeating the indexing and determining, for the next-highest-order one of the arrays and the next-most-significant component of the selected address value, when the flag is set on.

2. The computer program product according to claim 1, wherein the computer-readable program code means for repeating further comprises computer-readable program code means for setting a use count associated with the storage or memory location to a number which represents a count of the array entries which point to this storage or memory location when the next-sequential neighboring address component is not considered significant.

3. The computer-readable program product according to claim 2, wherein the stored information in the memory or storage location comprises an associated bit mask and wherein the computer-readable program code means for retrieving further comprises computer-readable program code means for resolving a collision, further comprising:
    computer-readable program code means for comparing the selected address value to each bit mask associated with the stored information from multiple storage or memory locations, yielding a plurality of bit mask results; and
    computer-readable program code means for selecting a collision result using that one of the bit mask results which both (1) matches the selected address value according to the selected bit mask and (2) has the longest associated bit mask.

4. The computer program product according to claim 1, wherein the address is an Internet Protocol (IP) address.

5. The computer program product according to claim 4, wherein the IP address is an IP version 4 address and wherein there are 4 components in each IP version 4 address and thus 4 arrays.

6. The computer program product according to claim 4, wherein the IP address is an IP version 6 address and wherein there are 16 address components in each IP version 6 address and thus 16 arrays.

7. The computer program product according to claim 1, wherein the computer-readable program code means for retrieving is performed by a plurality of distinct processors, each operating on different ones of the components of the selected address value.

8. The computer program product according to claim 1, wherein the stored information for each of the addresses comprises routing table information associated with a route to that address.

9. A system for providing fast and efficient address lookup for an address comprised of a plurality of address components and wherein each address component is deemed to be more significant than its next-sequential neighboring address component, the system comprising:
    means for creating a plurality of arrays comprising an array for each of the address components, wherein each array comprises a plurality of entries which are indexed using values of the address component for which the array was created, further comprising:
        means for obtaining a particular address value to be represented in the plurality of arrays;
        means for obtaining a bit mask associated with the particular address value;
        means for indexing into a highest-order one of the arrays using a most-significant component of the particular address value as an index element;
        means for setting a flag associated with the index element to on if the bit mask indicates that the next-sequential neighboring address component is considered significant, and for setting the flag to off otherwise; and
    means for repeating the indexing and setting, using the next-highest-order one of the arrays and the next-most-significant component of the particular address value, while the bit mask indicates that the next-sequential neighboring address component is considered significant, and for (1) storing information associated with the particular address value in a storage or memory location and (2) setting a pointer field associated with the index element to point to the storage or memory location, otherwise; and
    means for retrieving the stored information associated with a selected address value from the plurality of arrays, further comprising:
        means for obtaining the selected address value;
        means for obtaining a selected bit mask associated with the selected address value;
        means for indexing into the highest-order one of the arrays using the most-significant component of the selected address value as the index element; and
        means for determining that no result is available if the index element has no stored information, and for continuing otherwise, wherein the continuing further comprises:
            means for checking the flag associated with the index element; and
            means for returning the stored information from the storage or memory location pointed to by the pointer field when the flag is set off or for repeating the indexing and determining, for the next-highest-order one of the arrays and the next-most-significant component of the selected address value, when the flag is set on.

10. The system according to claim 9, wherein the means for repeating further comprises means for setting a use count associated with the storage or memory location to a number which represents a count of the array entries which point to this storage or memory location when the next-sequential neighboring address component is not considered significant.

11. The system according to claim 10, wherein the stored information in the memory or storage location comprises an associated bit mask and wherein the means for retrieving further comprises means for resolving a collision, further comprising:

means for comparing the selected address value to each bit mask associated with the stored information from multiple storage or memory locations, yielding a plurality of bit mask results; and means for selecting a collision result using that one of the bit mask results which both (1) matches the selected address value according to the selected bit mask and (2) has the longest associated bit mask.

12. The system according to claim 9, wherein the address is an Internet Protocol (IP) address.

13. The system according to claim 8, wherein the IP address is an IP version 4 address and wherein there are 4 components in each IP version 4 address and thus 4 arrays.

14. The system according to claim 8, wherein the IP address is an IP version 6 address and wherein there are 16 address components in each IP version 6 address and thus 16 arrays.

15. The system according to claim 9, wherein the means for retrieving is performed by a plurality of distinct processors, each operating on different ones of the components of the selected address value.

16. The system according to claim 9, wherein the stored information for each of the addresses comprises routing table information associated with a route to that address.

17. A method for providing fast and efficient address lookup for an address comprised of a plurality components and wherein each address component is deemed to be more significant than its next-sequential neighboring address component, the method comprising the steps of:

creating a plurality of arrays an array for each of the address components, wherein each array comprises a plurality of entries which are indexed using values of the address component for which the array was created, further comprising the steps of:

obtaining a particular address value to be represented in the plurality of arrays;

obtaining a bit mask associated with the particular address value;

indexing into a highest-order one of the arrays using a most-significant component of the particular address value as an index element;

setting a flag associated with the index element to on if the bit mask indicates that the next-sequential neighboring address component is considered significant, and setting the flag to off otherwise; and repeating the indexing and setting, using the next-highest-order one of the arrays and the next-most-significant component of the particular address value, while the bit mask indicates that the next-sequential neighboring address component is considered significant, and (1) storing information associated with the particular address value in a storage or memory location and (2) setting a pointer field associated with the index element to point to the storage or memory location, otherwise; and retrieving the stored information associated with a selected address value from the plurality of arrays, further comprising the steps of:

obtaining the selected address value;

obtaining a selected bit mask associated with the selected address value;

indexing into the highest-order one of the arrays using the most-significant component of the selected address value as the index element; and determining that no result is available if the index element has no stored information, and continuing otherwise, wherein the continuing further comprises the steps of:

checking the flag associated with the index element; and returning the stored information from the storage or memory location pointed to by the pointer field when the flag is set off or repeating the indexing and determining, for the next-highest-order one of the arrays and the next-most-significant component of the selected address value, when the flag is set on.

18. The method according to claim 17, wherein the repeating step further comprises the step of setting a use count associated with the storage or memory location to a number which represents a count of the array entries which point to this storage or memory location when the next-sequential neighboring address component is not considered significant.

19. The method according to claim 18, wherein the stored information in the memory or storage location comprises an associated bit mask and wherein the retrieving step further comprises resolving a collision, further comprising the steps of:

comparing the selected address value to each bit mask associated with the stored information from multiple storage or memory locations, yielding a plurality of bit mask results; and selecting a collision result using that one of the bit mask results which both (1) matches the selected address value according to the selected bit mask and (2) has the longest associated bit mask.

20. The method according to claim 17, wherein the address is an Internet Protocol (IP) address.

21. The method according to claim 20, wherein the IP address is an IP version 4 address and wherein there are 4 components in each IP version 4 address and thus 4 arrays.

22. The method according to claim 20, wherein the IP address is an IP version 6 address and wherein there are 16 address components in each IP version 6 address and thus 16 arrays.

23. The method according to claim 17, wherein the retrieving step is performed by a plurality of distinct processors, each operating on different ones of the components of the selected address value.

24. The method according to claim 17, wherein the stored information for each of the addresses comprises routing table information associated with a route to that address.

25. A method for providing fast and efficient address lookup for an address comprised of a plurality of address components, the method comprising the steps of:

creating a plurality of arrays comprising an array for each of a plurality of address components which together comprise an address, wherein each array comprises a plurality of entries which are indexed using values of the address component for which the array was created; and storing entries and information for each address to be subsequently looked up, further comprising the steps of:

creating an entry for a particular address using the plurality of arrays by indexing into a highest-order one of the arrays using a most-significant component of the particular address as an index element; setting a flag associated with the index element to on if a bit mask associated with the particular address indicates that the next-most-significant component of the particular address is considered significant, and setting the flag to off otherwise; and repeating the indexing and setting, using the next-highest-order one of the arrays and the next-most-significant component of the particular address, while the bit mask indicates that the next-most-significant component of the particular address is considered significant; and storing information associated with the particular address in a storage or memory location associated with a last significant component of the entry, wherein the last significant component is determined by the bit mask associated with the particular address, and setting a pointer filed associated with the last significant component of the entry to point to the storage or memory location.

26. The method according to claim 25, further comprising the step of subsequently looking up a selected address by retrieving the stored information associated with the selected address from the plurality of arrays.

27. The method according to claim 26, wherein the retrieving step further comprises the steps of:

indexing into the highest-order one of the arrays using the most-significant component of the selected address as the index element;

while the flag associated with the index element is set on, indexing into the next-highest-order one of the arrays using the next-most-significant component of the selected address as the index element, thus reaching a selected one of the arrays;

if the pointer field associated with the selected one of the arrays points to a storage or memory location containing stored information, using that stored information as the retrieved information, and if not, iteratively checking the pointer field associated with a next-previous-highest-order one of the arrays until the pointer field associated therewith points to a storage or memory location containing stored information for using as the retrieved information or until no more ones of the arrays remain for checking, in which case no stored information is retrieved.

* * * * *

UNITED STATES PATENT AND TRADEMARK OFFICE
CERTIFICATE OF CORRECTION

PATENT NO. : 6,895,442 B1
APPLICATION NO. : 09/680791
DATED : May 17, 2005
INVENTOR(S) : Khanna It is certified that error appears in the above-identified patent and that said Letters Patent is hereby corrected as shown below:

Column 11,
Line 37, change "computer-readable program to" to -- computer program --;

Column 13,
Line 14, change "claim 8" to -- claim 12 --;
Line 17, change "claim 8" to -- claim 12 --;
Line 29, change "plurality components" to -- plurality of address components --;
Line 33, change "arrays an array" to -- arrays comprising an array --.

Signed and Sealed this

Fifteenth Day of August, 2006

JON W. DUDAS
*Director of the United States Patent and Trademark Office*